(No Model.)  3 Sheets—Sheet 1.
J. A. SPENCER.
BALING PRESS.
No. 262,992.  Patented Aug. 22, 1882.
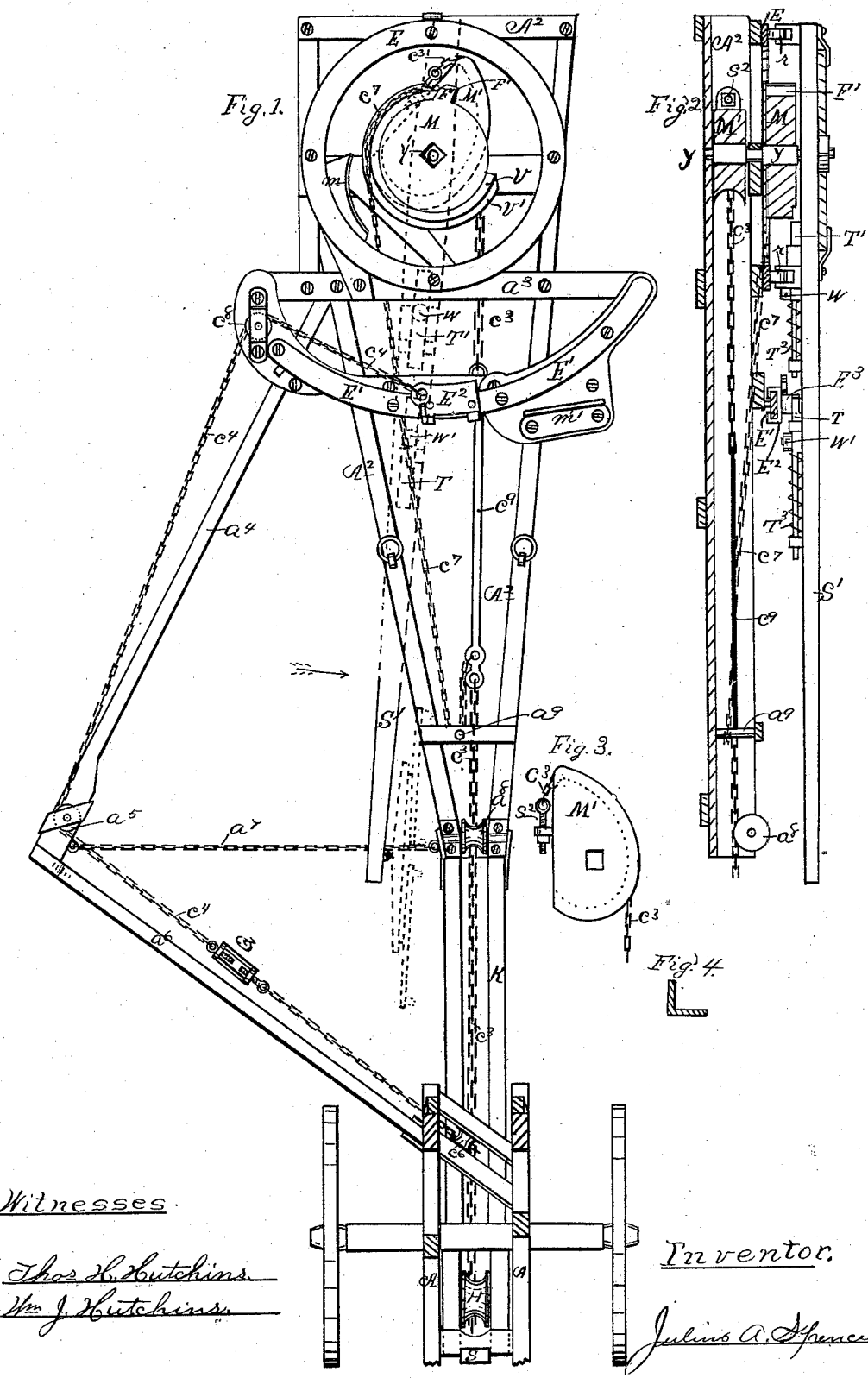
Witnesses
Thos. H. Hutchins
Wm. J. Hutchins
Inventor.
Julius A. Spencer (No Model.) 3 Sheets—Sheet 2.
J. A. SPENCER.
BALING PRESS.
No. 262,992. Patented Aug. 22, 1882.
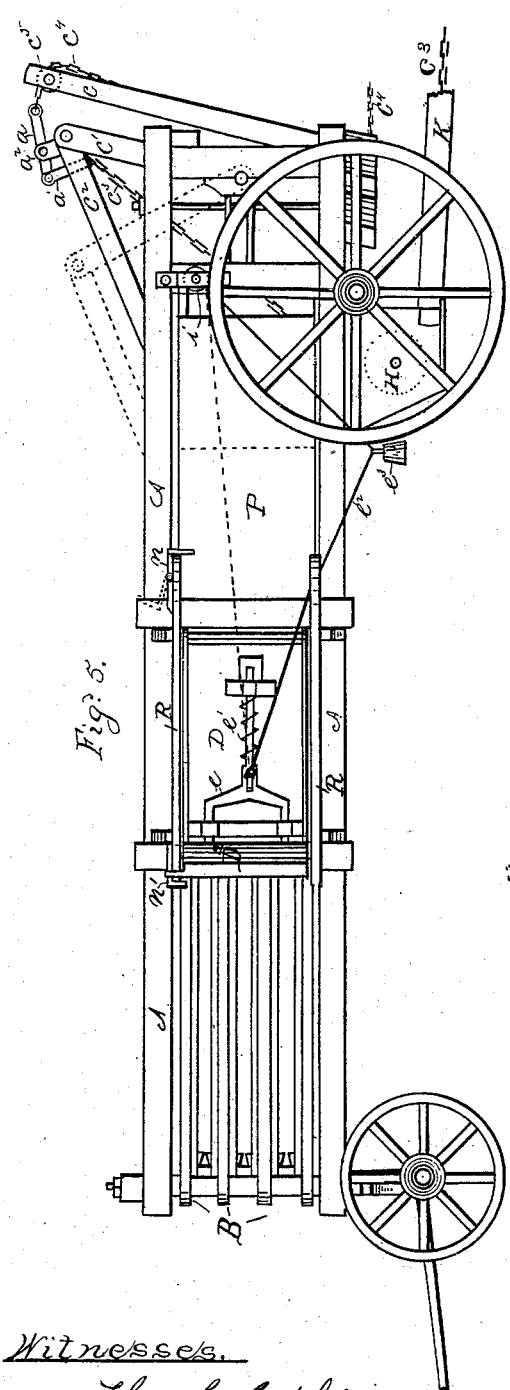
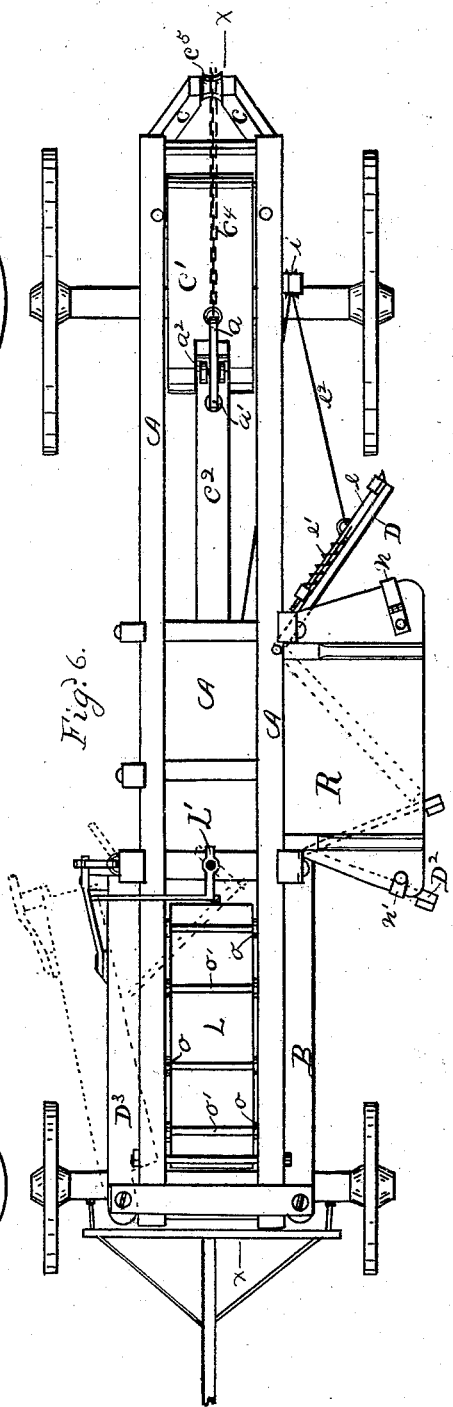
Witnesses.
Thos. H. Hutchins.
Wm. J. Hutchins.
Inventor.
Julius A. Spencer.

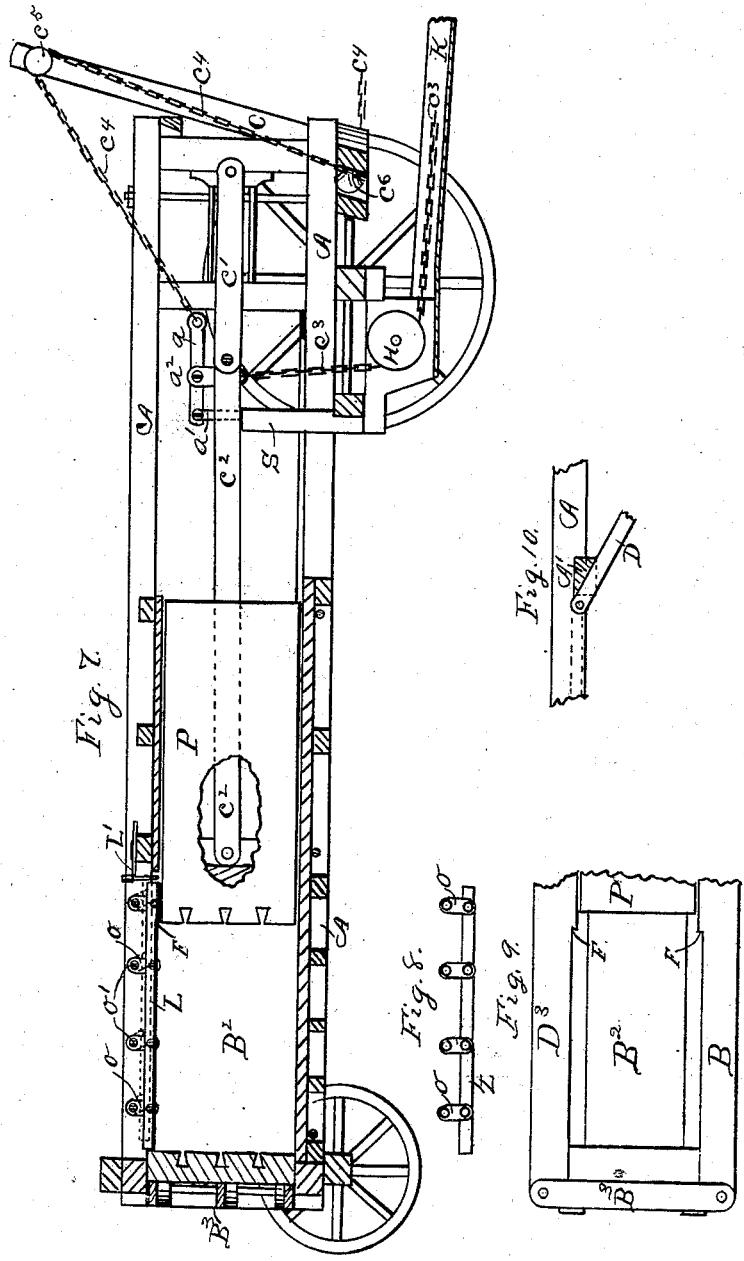

UNITED STATES PATENT OFFICE.

JULIUS A. SPENCER, OF DWIGHT, ILLINOIS.

BALING-PRESS.

SPECIFICATION forming part of Letters Patent No. 262,992, dated August 22, 1882.

Application filed April 8, 1882. (No model.)

*To all whom it may concern:*

Be it known that I, JULIUS A. SPENCER, of Dwight, in Livingston county, in the State of Illinois, have invented certain new and useful Improvements in Baling-Presses for Baling Hay or any Fibrous Material, the construction and operation of which I will proceed to explain, reference being had to the annexed drawings and the letters and figures thereon, in which—

Figure 1 is a plan view on the top of the power mechanism for operating the machine; Fig. 2, a central longitudinal vertical sectional view of the same; Fig. 3, a plan view on the top of the cam $M'$ of the horse-power; Fig. 4, a cross-sectional view of the switches $m$ and $m'$; Fig. 5, a side elevation of the baling-press; Fig. 6, a plan view on the top of the same; Fig. 7, a central vertical longitudinal sectional view of the same on the line $x$, Fig. 6; Fig. 8, a side view of the roof of the baling-chamber; Fig. 9, a view in the baling-chamber $B^2$, looking down on its floor; and Fig. 10, a plan view on the upper edge of the inner end of the door D, showing its attachment to the frame A and how far back it can open.

This baling-press is of the class called "toggle-joint" presses, whereby the follower is operated in the baling-chamber by a toggle-joint, and is of the kind denominated "procumbent" or "horizontal" presses, and is so constructed that the material to be baled is fed into the side of the machine in front of the follower, and after being compressed into a bale is ejected from the side of the baling-chamber from the opposite side to which it is fed in the machine from a door which may open to permit the bale to be removed and closed to form resistance to the succeeding bale.

The machine is operated by the power mechanism shown in Figs. 1 and 2 in such a manner that the horse that operates it travels around in one direction continuously, so that it reciprocates the follower of the machine back and forth.

Referring to the drawings, I will first explain Figs. 1 and 2 representing the power mechanism by which the machine is operated, and which forms one of the essential features of my invention, its construction being of such a peculiar character that it is of little or no value disconnected from such a peculiarly-constructed baling-press, the power mechanism and baling-press forming together a complete machine, one part being quite useless without the other as they are constructed and arranged. The power mechanism rests on the bed-frame $A^2$, widened at the outer end, as shown in Fig. 1, to receive the circle E, upon which the casters $r$ of the sweep $S'$ travel, as shown in Fig. 2. The sweep $S'$ is attached to the bed $A^2$ by means of the king-bolt $y$, which it rotates as it travels, and is held firmly thereon by a key or the nut $y'$ on the top. The king-bolt $y$ bears the drive-wheel M immediately below the sweep $S'$, and also the grooved cam-wheel $M'$ below the drive-wheel M, as shown in Fig. 2, both of which are rigidly keyed thereto and rotate with it.

The chain $c^3$ has its outer end attached to the periphery of the cam $M'$ by means of the adjustable screw $S^2$, as shown in Fig. 3, while its inner end attaches to the under side of the toggle-joint $c'$ $c^2$, Fig. 5, and is the chain that brings the toggle-joint down to drive the follower P forward into the bale-chamber. The inner end of the chain $c^7$ attaches to the periphery of the drive-wheel M, and, after passing around the friction-post $a^9$, attaches to the drive-chain $c^3$, as shown in Fig. 1, and is used for the purpose of taking up the slack of chain $c^3$ when the cam $M'$ reverses its motion, so the chain $c^3$ will not tangle, the link $c^9$ preventing the chain $c^3$ returning too far, as it will not go around the friction-bolt $a^9$. The outer end of the chain $c^4$ attaches to a carriage, $E^2$, that reciprocates, in the manner hereinafter described, on the segment-track $E'$, and, after passing out around the sheaves $c^8$ $a^5$ and $c^6$ and $c^5$ on the upper end of the posts $c$, attaches at its inner end to the lever $a$ of the toggle-joint $c'$ and $c^2$, as shown in Fig. 5. This chain $c^4$ returns the follower P from the baling-chamber, as will be hereinafter described. The beams $a^4$ and $a^6$ are braces to support the sheave $a^5$, and the chain $a^7$ attaches them to the bed $A^2$ of the power mechanism, as shown in Fig. 1.

The mode of operation of this power mechanism is as follows: When the sweep $S'$ travels forward in the direction indicated by the arrows the spring-bolt $T'$ on the under side of the sweep $S'$ (shown in Fig. 2 more particularly) will engage at its outer end with the projecting lug F' on the periphery of the drive-wheel M and rotate it until the projecting lug W on the spring-bolt T' engages with the outer face of the eccentrically-set switch $m$, which withdraws the bolt T' from contact with the lug F' on the wheel M. Just at the instant such contact is relieved the projecting lug W of the spring-bolt T' passes the switch $m$ and is relieved from contact with it and springs back by means of the spring $T^2$ to its original position to perform another like operation. At the instant the said lug F' and bolt T' so disengage the spring-bolt T, similarly arranged on the under side of the sweep S', engages with the carriage $E^2$ by means of its upturned lug $E^3$ and carries it forward along the segmental track E', to which it is attached, as shown in Fig. 2, until the lug W' of the said spring-bolt T engages with the outer face of the switch $m'$, by means of which the bolt T and carriage $E^2$ become disengaged from each other. It will be seen that by one revolution of the sweep the cam M is rotated far enough to straighten out the toggle-joint $c'$ $c^2$ and force the plunger P into the baling-chamber, and also, by means of the carriage $E^2$ and chain $c^4$, attached to the upper side of said toggle-joint, return the plunger P from the baling-chamber, by this means of engaging and disengaging the sweep S' with the drive-wheel M and carriage $E^2$ alternately at each revolution of the sweep S'. As the cam M' winds up the chain $c^3$ to force the plunger P forward it also returns the carriage $E^2$, as the toggle-joint, by its being depressed, draws with it the chain $c^4$, which attaches to said carriage, $E^2$, and thus returns it to its original position. By this arrangement the cam-wheel M' only partially rotates backward and forward to wind up and unwind the chain $c^3$, as stated, and the carriage $E^2$ reciprocates back and forth to elevate the toggle-joint and return the follower P, as stated; and by this arrangement the said chains are all kept from being tangled, and the horse that pulls the sweep S' around travels in one direction continuously without the necessity of turning about or backing up, as is usually the case in a toggle-joint press. The projection or platform $v'$, below the drive-wheel M, between it and the cam M', prevents the chain $c^7$ from falling off the wheel M. The screw-bolt $S^2$, on the cam M', is for the purpose of tightening up the chain $c^3$ should it become slack, as shown in Fig. 3. The trough K connects the power mechanism with the press, and serves to conduct the chain $c^3$ into the press as it passes under the sheaves $a^8$ and H.

In the baling-press I will proceed to name the new features.

First. The arrangement of the lever $a$ on the toggle-point $c'$ and $c^2$, and to which lever the chain $c^4$ attaches. The lever $a$ is fulcrumed at $a^2$ on the toggle $c^2$ and pivoted at its outer end to the post $a'$, which passes through the toggle $c^2$ and stands on the frame S, Fig. 7. By this arrangement the toggle-joint is easily started to raise by the leverage thus formed, as is very obvious from said figure.

Another novel feature is in the arrangement of the door D. (Shown more particularly in Fig. 6.) Heretofore the door D could only be opened at about right angle with the press, and for that reason it was in the way, so the operator could not shove the bale-chamber full of hay as well as the ante-chamber opposite the door D. By permitting the door D to open in the position shown in Figs. 6 and 10 the bale-chamber may be entirely filled by a fork, as well as the ante-chamber for the first feed. After the bale and ante chambers are both filled as full as is necessary, the door D is closed and fastened by the spring-latch $e$. As the follower P presses forward, and its face has reached the entrance of the bale-chamber, it opens the door D by means of the cord $e^2$, which attaches the said door to the follower P, which cord $e^2$, after passing over the sheave $i$ on the side of the machine, attaches to the spring-latch $e$, so that when the follower has done its work and returned the door D is open ready to receive another charge in the machine, as before stated. The weight $e^3$ serves to hold the cord $e^2$ taut, so it will not tangle, and hold the door D wide open, as shown in Fig. 6.

Another new feature is in the construction of the roof of the bale-chamber $B^2$ so that pressure on the bale can be relieved after it is tied so it can be easily ejected. The roof L of the bale-chamber hangs suspended by a series of swinging arms, $o$, in the frame A to cross-rods $o'$, as is shown in Figs. 7 and 8. After the bale is formed, and it is desired to relieve it from pressure above, the lever L' (shown in Figs. 6 and 7) is moved, as shown by the dotted lines in Fig. 6, by means of which the roof L will swing toward the said lever, thus becoming elevated a trifle, whereby the bale is loosed in the chamber, and after the discharge-door $D^3$ is opened may be very easily pulled out. The bale-chamber is a trifle wider than the space occupied by the follower immediately in front of it, as shown in Fig. 9, so that the offsets F assist to retain the hay, especially when the hay is pressed into a bale by successive charges. The baling-chamber is provided at its side with the ordinary baling-slots formed by the bars B, arranged a little ways apart, and also by the tying-slots in the face of the follower and at the opposite end of the bale-chamber, as shown in Fig. 7.

The drive-wheel M is provided with a wooden tire, $v$, Fig. 1, forming a more yielding surface for the chain $c^7$ to wind on, and which can be easily replaced when worn.

The chain $c^4$ is provided with a turn-buckle, Q, as shown in Fig. 1, to regulate the length of the said chain.

Having thus described my invention, what I claim as new, and desire to secure by Letters Patent, is as follows, to wit:

1. In a procumbent toggle-joint baling-press, the lever $a$, in combination with the toggle-joint $c'$ and $c^2$, posts $a'$ and S, and chain $c^4$, for the purpose set forth.

2. In a baling-press, the combination and arrangement of the swinging roof L, arms $o$, and bale-chamber $B^2$, as and for the purpose set forth.

3. In a baling-press, the combination of the follower P, baling-chamber having the offsets F, swinging roof L, door $D^3$, lever L', pitman $c^2$, lever $c'$, and frame A, as and for the purpose set forth.

4. In a toggle-joint baling-press, the power mechanism constructed and arranged, as described, so that a continuous motion in one direction of the sweep S' will cause the chains $c^3$ $c^7$ $c^4$ and link $c^9$ to operate alternately the follower P, as set forth, by means of the spring-bolts T and T', having the lugs W and W', drive-wheel M, having the lug F, cam M, carriage $E^2$, and switches $m$ and $m'$.

5. In a baling-press, the combination of the link $c^9$ in the chain $c^3$, chain $c^7$, and friction-pin $a^9$ with the cam M' and drive-wheel M, for the purpose set forth.

6. In a toggle baling-press, the combination and arrangement of the sweep S', drive-wheel M, having the lug F' and wood tire $v$, cam M', having the adjustable link and nut $S^2$, spring-bolts T and T', having the lugs W and W', circular track E, casters $r$, segment-track E', carriage $E^2$, switches $m$ and $m'$, chains $c^3$ $c^4$ $c^7$, link $c^9$, friction-bolt $a^9$, braces $a^4$ and $a^6$, chain $a^7$, and frames $A^2$ and trough K, as and for the purpose set forth.

7. In a toggle-joint baling-press, the power mechanism described, containing the sweep S', spring-bolts T and T', having the lugs W and W', drive-wheel M, having the lug F', cam M', carriage $E^2$, and switches $m$ and $m'$, whereby the chains $c^3$ $c^7$ and link $c^9$ and chain $c^4$ are caused to move forward and backward alternately for the purpose set forth.

JULIUS A. SPENCER.

Witnesses:
THOS. H. HUTCHINS,
WM. J. HUTCHINS.